July 6, 1948.
J. L. MOSSHOLDER
2,444,744
MACHINE FOR PREPARING CONTAINERS FOR
TRANSPLANTED NURSERY STOCK
Filed May 8, 1946
2 Sheets-Sheet 1
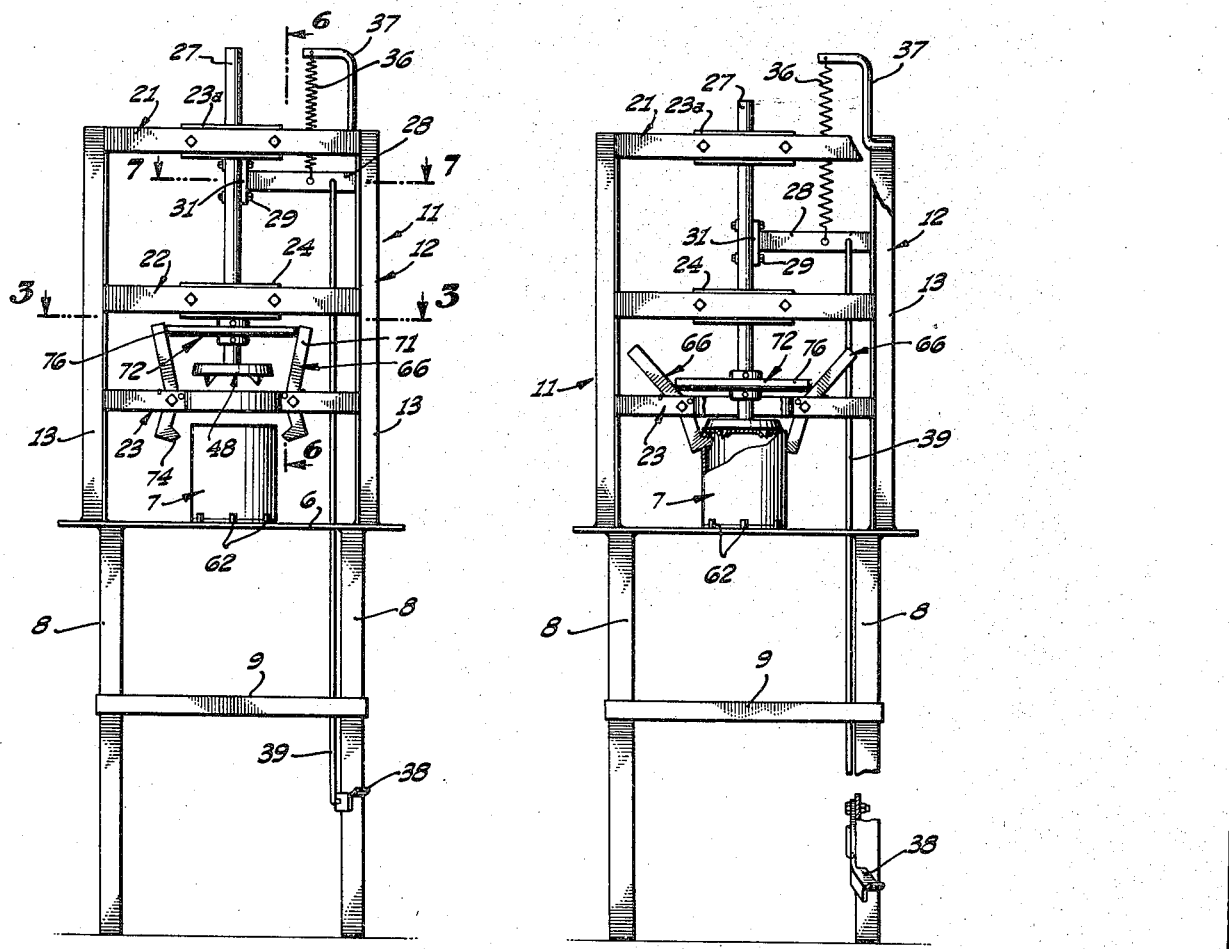
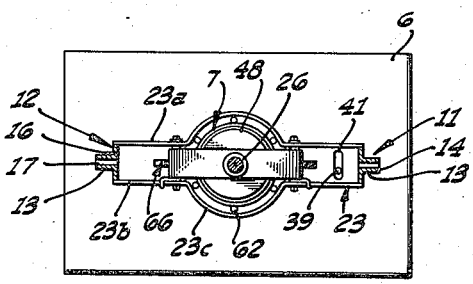
INVENTOR.
JOSEPH L. MOSSHOLDER,
BY
ATTORNEY.

INVENTOR.
JOSEPH L. MOSSHOLDER,
BY
ATTORNEY.

Patented July 6, 1948

2,444,744

UNITED STATES PATENT OFFICE 2,444,744

MACHINE FOR PREPARING CONTAINERS FOR TRANSPLANTED NURSERY STOCK

Joseph L. Mossholder, Puente, Calif.

Application May 8, 1946, Serial No. 668,091

3 Claims. (Cl. 47—37)

This invention relates to plant husbandry and has for an object the provision of a machine for preparing containers for the reception of nursery stock.

The customary manner in which professional nurserymen offer many different varieties of growing plants for sale on a commercial basis entails transplanting them from the beds or flats, in which they have been started from seed, into small flower pots when the plants have attained a height of say from one to three inches and, after a further period of growth has been completed, to transplant them again into larger containers, the usual type of container for this second transplanting being the conventional gallon can which is available in large numbers. However, a difficult and relatively expensive step in the process is that of preparing the gallon cans for the reception of the nursery stock being transplanted from the small "starting pots" since each can must be pierced either through the bottom or through the side walls of the can near the bottom, after which it must be filled with earth, the earth tamped or firmed within the can so that a hollow formed in the upper surface of the earth will retain its form to permit the reception of the roots and a material quantity of earth surrounding them, preferably in the form of a clod conforming in shape to the interior of the starting pot from which it has just been removed, since it is desirable to avoid disturbing the roots of the seeding plant and thus interfere as little as possible with the continuity of its development. Heretofore it has been customary to perform all these steps of preparing the gallon cans and their earth contents by hand, a slow, tedious, and relatively expensive process. The present invention seeks to minimize the time and expense required for the performance of these routine tasks by performing them mechanically in such a manner that they are carried out rapidly and easily.

Another object is to provide a machine for preparing containers for nursery stock to be transplanted which is of simple and rugged construction, which is capable of operating rapidly and effectively, and which is capable of performing the functions for which it is designed with the utmost efficiency.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a view in front elevation of a machine for preparing containers for nursery stock to be transplanted, constructed in accordance with the principles of the present invention. This view shows the apparatus for piercing the side walls of the can near the bottom in its initial or starting position.

Figure 2 is a view similar to Figure 1, but showing the can piercing mechanism in the second phase of its operation.

Figure 3 is a horizontal sectional view, the plane of section being indicated by the line 1—1 and the direction of view by the arrows.

Figure 4:
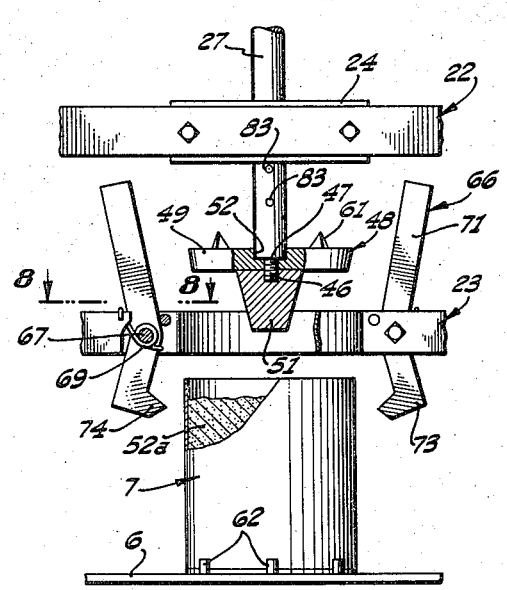
Figure 4 is an enlarged detail view in front elevation of the operating parts of the machine but with the can piercing operation inoperative and the soil tamping and dibbling head in position in readiness for commencement of its stroke.

In the modification of the machine chosen for illustration and description herein, the machine which I have invented for preparing one gallon tin cans for the reception of nursery stock to be transplanted, comprises a flat table 6 adapted to support the containers 7, this table being supported by suitable legs 8 at that elevation which affords the greatest comfort to the person operating the mahcine. Preferably, the container-supporting table 6 is formed of a flat sheet of metal plate, the legs 8 are formed of angle iron and the bracing 9 for the legs 8 is formed of flat strap iron. Extending upward from the table 6 is a frame 11 preferably in the form of a pair of laterally spaced, vertically extending members 12, each of which comprises a pair of angle irons 13. The angle irons 13 of each pair 12 are disposed with their inner flanges 14 arranged in a common plane extending longitudinally, i. e., fore and aft of the machine, and with their other flanges 16 extending laterally outwards from the aligned flanges 14 and spaced apart from each other to provide a vertically extending channel or guideway 17 extending upwards from adjacent each lateral edge of the table 6. The lower ends of the angle irons 13 are welded or otherwise rigidly secured to the upper face of the table 6 and the upper ends of the angle irons 13 of each pair 12 are retained in spaced-apart relation so as to preserve their parallel arrangement by suitable spacers (not shown) welded to the flanges 16 or otherwise rigidly secured in position. Moreover, the side bars 12 are interconnected by a plurality, preferably three, transversely extending horizontal bars 21, 22, and 23, respectively, which are offset toward the front of the machine from the channels 17 inasmuch as they are secured to the forward vertical edges of the forwardly extending flanges 14 of the two angle irons 13 on each side of the machine. Because of this offset positioning of the two upper horizontal bars 21 and 22, bearing blocks 23 and 24, respectively, which are secured thereto and which extend rearwardly from the after faces of the two horizontal bars 21 and 22, are disposed with vertically aligned holes 26 in alignment with the channels or guideways 17 so that a plunger rod 27 which is mounted for vertical reciprocatory movement within the two aligned holes 26 of the bearing blocks 23 and 24 is in coplanar alignment with the two channels 17. This facilitates guiding the outer end of an arm 28 within one of the channels 17, whereas the inner end of the arm 28 is secured rigidly as by a plurality of machine screws 29 or the like, to the plunger rod 27 in such position that the arm 28 is just below the upper bearing block 23 when the plunger rod 27 is in its uppermost position, as illustrated in Figure 1. The inner end of the arm 28 may be provided with an enlarged head 31 through which the machine screws 29 extend to add to the security with which the arm 28 is retained in position, extending laterally and preferably perpendicularly with respect to the plunger rod 27.

The plunger rod 27 is at all times urged to its upper extreme of movement as by a coil spring 36 under tension between the horizontal arm 28 and a bracket 37 rigid with and extending upwardly from the upper end of one of the side members 12 of the frame 11. Means are provided for forcing the plunger rod 27 downwards by depressing a pedal 38 pivotally secured to one of the legs 8 adjacent its lower end and connected to the horizontal plunger-operating arm 28 as by a tension bar or rod 39 for the accommodation of which a suitable slot 41 is provided in the table 6.

As is best shown in Figure 4, the lower end of the plunger rod 27 is equipped with a threaded pin 46 arranged coaxially with and materially smaller in diameter than the remainder of the rod 27, thus presenting a shoulder 47 at the upper end of the pin 46. In this manner provision is made for the removable reception of a head 48 upon the lower end of the plunger rod 27 in two optional arrangements. The head 48 comprises a presser plate 49 and a dibble 51 both of which are provided with axial holes threaded so as to permit the plate 49 and dibble 51 to be screwed onto the threaded pin 46. Preferably the pin 46 substantially coincides in length to the thickness of the plate 49; but that face of the plate 49 which is intended to be uppermost when the plate 49 is used in conjunction with the dibble 51 is counterbored as indicated at 52 so that when the plate 49 is threaded onto the pin 46 with its counterbored face upwards as in Figure 4, the shoulder 47 of the rod 27 will seat within the counterbore 52, thus permitting a sufficient length of the pin 46 to extend through and below the plate 49 for the reception of the dibble 51, as also illustrated in Figure 4.

The plate 49 preferably coincides in shape and is slightly smaller than the upper end of the container 7 to be prepared so that when a container 7 filled with earth 52 is positioned below the plunger and the pedal 38 is depressed, the rod 27 will lower the plate 49 until it enters the upper end of the container 7 and thereafter force the plate 49 into the container 7 with sufficient pressure to tamp the earth 52a with a degree of firmness determined by the amount of pressure exerted upon the pedal 38. Consequently, when the type of container 7 which is being prepared is that to which reference has been made hereinabove, i. e., the conventional one-gallon tin cans, the form of the plate should be circular. It should be understood, however, that if other types of containers 7 are to be prepared, an appropriately shaped pressure plate 49 should be substituted for the circular pressure plate.

Similarly, the dibble 51 is preferably of inverted frusto-conical form substantially conforming in both shape and size to the interior of the conventional starting pots in which it is customary for the plants to be transplanted to the containers 7 to receive their early stages of growth. Consequently, when the dibble 51 is positioned as illustrated in Figure 4, extending downwardly from the under surface of the pressure plate 49, actuation of the plunger in the manner described will result in the formation of a depression 53 in the upper surface 54 of the tamped earth 52a simultaneously with the performance of the tamping operation already described, with the result that after the plunger 27 and its head 48 have been withdrawn, the depression 53 then provided in the upper surface of the suitably tamped earth will be of just the right size for the reception of the clod of earth and roots which have been removed from one of the starting pots, with the result that a plant may be transplanted from a starting pot to one of the containers 7 with substantially no disturbance of its root system.

A plurality of piercing punches 61 are provided upon the plate 49, these punches 61 being in the form of a plurality of relatively sharp points projecting from that face of the plate 49 which is opposite the smooth face which is intended to be facing downwards when the dibble 51 is in operative position. That is to say, the piercing punches 61 are mounted on the same side of the plate 49 as that in which the counterbore 52 is formed. Consequently, when it is desired to form holes in the bottoms of a supply of the empty containers 7 prior to their being filled with earth, the dibble 51 should be unscrewed from the threaded pin 46, whereupon the plate 49 also may be removed from the lower end of the rod 27 and, after having been inverted, threaded back onto the pin 46 so as to mount the plate 49 in such inverted position rigidly upon the lower end of the plunger rod. When so disposed, lowering of the plate 49 onto the bottom of an inverted container 7 will cause the piercing punches 61 to form drainage holes in the bottom of a container 7 suitably positioned upon the table 6.

In order to facilitate placing the container 7 accurately in alignment with the plunger 27 and its working head 48, whether the can be in inverted position so as to permit piercing its bottom or in upright position and filled with earth so as to perform the tamping and dibbling operation, a plurality of stops 62 are rigidly secured to the upper surface of the table 6. These stops preferably are in the form of pins welded or otherwise rigidly secured to the table and arranged in an arc, the center of which lies in the axis of the plunger rod 27 and the radius of which substantially coincides with that of the container 7.

Figure 5:
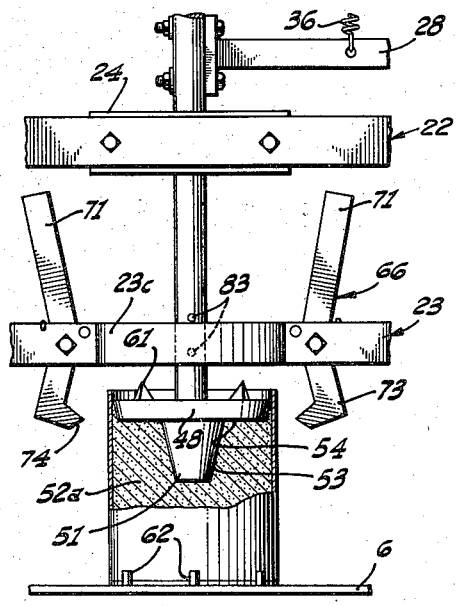
Figure 5 is a view similar to Figure 3, but showing the soil tamping and dibbling head on completion of its operating stroke.
Figure 8:
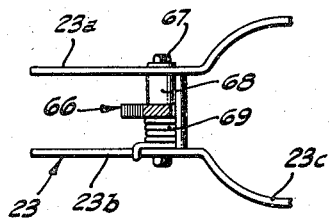
Figure 8 is a horizontal, detail view taken upon the line 8—8 of Figure 4 with the direction of view as indicated.

In some cases it may be preferable to form drainage openings in side walls of the container 7 just above its bottom and for this purpose I also prefer to provide a pair of levers 66 pivotally mounted upon the lowermost horizontal bar 23 for rocking movement about horizontal axes equally spaced on opposite sides of the line of action of the plunger 27. To facilitate so mounting the levers 66, I prefer that the lowermost horizontal bar 23 be composed of two flat strips 23a and 23b secured at their ends to the forward and after edges respectively of the vertically extending side bars 12 of the frame 11. The central portions of these two strips 23a and 23b should be bowed outwardly as indicated at 23c so as to permit passage of the tamping plate 49 therebetween as the plunger rod 27 is reciprocated. The axes about which the levers 66 are pivoted are provided by suitably positioned bolts 67 extending through and between the two strips 23a and 23b and preferably carrying distance washers 68 serving to hold the levers 66 centrally disposed between the two strips 23a and 23b (see Figure 8). Coil springs 69 also encircling the bolts 67 continually urge the lever 66 to rotate to their extreme positions wherein the upper ends 71 are in their positions of nearest approach to the plunger rod 27. When so disposed (see Figures 1, 4, and 5) they incline upwards and outwards slightly displaced from the vertical and they are adapted to be engaged by a cam 72 carried by and extending laterally from the plunger rod 27. The parts are so proportioned and arranged that as the plunger rod 27 and its cam 72 move downwards, the outer ends of the cam 72 slide along the downwardly and inwardly inclined inner faces of the upper ends 71 of the levers 66, thus forcing the upper ends 71 apart and causing the lower ends 73 of the levers 66 to move inwards with sufficient force to cause piercing punches 74 extending inwards from the lower ends 73 to penetrate the side walls of a container 7 resting upon the plate 6. The length of the lower ends 73 of the levers 66 is such that the side walls of the container 7 will be penetrated closely adjacent the bottom of the container if the container is placed upon the table 6 in inverted position.

Figure 6:
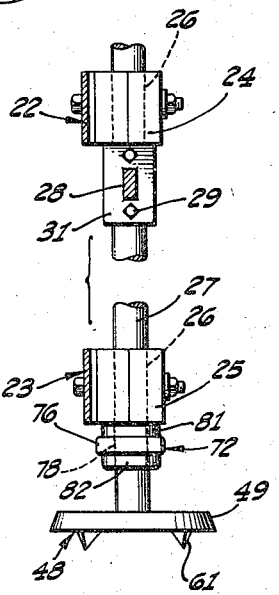
Figure 6 is an enlarged detail view in vertical medial section taken through the plunger of the machine upon the line 6—6 of Figure 1 with the direction of view as indicated.
Figure 7:
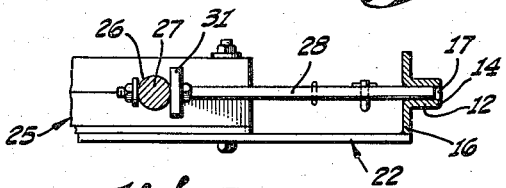
Figure 7 is an enlarged, horizontal, sectional view taken upon the line 7—7 of Figure 1, with the direction of view as indicated.

The cam 72 is in the form of a pair of laterally extending arms 76 rigid and preferably integral with a central and enlarged head (see Figure 6) having a vertical hole 78 through which the plunger rod 27 extends. The cam 72 is therefore free to rotate about the axis of the rod 27, thus permitting it to be placed optionally in operative or inoperative position by rotating it so that its arms 76 are in registering or non-registering position, respectively, with respect to the upper ends 71 of the levers 66. The cam 72 is held against moving axially along the rod 27 by means of upper and lower collars 81 and 82, respectively, rigidly secured to the rod 27 above and below the cam as by anchoring pins 83, one or both of which may be removable so as to permit removing the cam 72 if and when desired.

I claim:

1. A machine for preparing containers for nursery stock to be transplanted from starting pots, said machine comprising means providing a support for one of said containers having soil therein, a frame extending above said support, a plunger mounted on said frame for movement toward and away from said support, a head carried by said plunger and comprising a presser plate, a dibble projecting from one face of said plate and substantially corresponding in form to the interior of one of said starting pots, and a piercing punch projecting from the other face of said plate, and means for removably securing said head in operative position upon said plunger optionally, with either of said faces directed toward said support.

2. A machine for preparing containers for nursery stock to be transplanted from starting pots, said machine comprising means providing a container support, a frame extending thereabove, vertically aligned bearings carried by said frame, a plunger movable axially in said bearings, a threaded pin rigid with and extending downwards from the lower end of said plunger, a presser plate substantially corresponding in thickness to the length of said pin projecting from said plunger and having a hole therethrough and being threaded for the reception of said pin with said plate optionally either side up, a recess in one face of said plate adapted to receive the lower end of said plunger whereby said plate can be threaded onto said pin with said recessed side uppermost far enough for a portion of said pin to extend through said plate, a dibble removably receivable upon said portion of said pin below said plate, and piercing punches extending from said recessed side of said plate.

3. A machine for preparing containers for nursery stock to be transplanted from starting pots, said machine comprising means providing a container support, a frame extending thereabove, vertically aligned bearings carried by said frame, a plunger movable axially in said bearings, a pair of levers pivotally mounted on said frame for rocking movement about horizontal axes on opposite sides of said plunger, the upper ends of said levers being outwardly inclined, inwardly directed piercing punches carried by the lower ends of said levers, spring means urging the lower ends of said levers apart and the upper ends of said levers toward each other, and a cam adjustably mounted on said plunger for movement optionally into position to engage said upper ends of said lever and force said lower ends inwards as said plunger moves downwards, and means for operating said plunger.

JOSEPH L. MOSSHOLDER.

REFERENCES CITED

The following references are of record in the file of this patent:

FOREIGN PATENTS

| Number | Country | Date |
| --- | --- | --- |
| 571,084 | Germany | Feb. 25, 1933 |
| 638,100 | Germany | Nov. 9, 1936 |